United States Patent
Sambhy et al.

(10) Patent No.: US 12,422,762 B2
(45) Date of Patent: Sep. 23, 2025

(54) ANTIMICROBIAL TONER PARTICLES

(71) Applicant: XEROX CORPORATION, Norwalk, CT (US)

(72) Inventors: Varun Sambhy, Pittsford, NY (US); Eliud Robles Flores, Webster, NY (US); Douglas Allen Gutberlet, Ontario, NY (US); Paul F. Sawicki, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 839 days.

(21) Appl. No.: 17/454,198

(22) Filed: Nov. 9, 2021

(65) Prior Publication Data

US 2023/0143526 A1    May 11, 2023

(51) Int. Cl.
G03G 9/087    (2006.01)
G03G 9/08     (2006.01)
B82Y 40/00    (2011.01)

(52) U.S. Cl.
CPC ....... G03G 9/08711 (2013.01); G03G 9/0819 (2013.01); G03G 9/0825 (2013.01); B82Y 40/00 (2013.01)

(58) Field of Classification Search
CPC ........... G03G 9/09708; G03G 9/09741; G03G 9/09775
See application file for complete search history.

(56) References Cited

U.S. PATENT DOCUMENTS

| | | | |
|---|---|---|---|
| 3,893,935 A * | 7/1975 | Jadwin | G03G 9/09741 430/108.2 |
| 5,527,658 A | 6/1996 | Hopper et al. | |
| 7,476,698 B2 | 1/2009 | Wagener et al. | |
| 9,247,736 B2 | 2/2016 | Ylitalo et al. | |
| 10,007,200 B2 | 6/2018 | Farrugia et al. | |
| 2004/0247653 A1 | 12/2004 | Gabbay | |
| 2009/0081572 A1 * | 3/2009 | Kmiecik-Lawrynowicz | G03G 9/08797 430/113 |
| 2013/0071143 A1 * | 3/2013 | Blanton | G03G 9/1355 399/223 |
| 2016/0326284 A1 * | 11/2016 | Farrugia | G03G 9/093 |
| 2020/0139739 A1 | 5/2020 | Robles Flores et al. | |
| 2020/0142341 A1 | 5/2020 | Robles Flores et al. | |

FOREIGN PATENT DOCUMENTS

| | | | | |
|---|---|---|---|---|
| JP | 63-271474 | * | 11/1988 | G03G 9/08 |
| JP | 2012-042695 | * | 3/2012 | G03G 9/08 |
| WO | 2005/015319 A1 | | 2/2005 | |

OTHER PUBLICATIONS

Translation of JP63-271474.*
Translation of JP 2012-042695.*
Diamond, "Handbook of Imaing Materials," 1991, Marcel Dekker, NY, NY.*

* cited by examiner

Primary Examiner — Peter L Vajda
(74) Attorney, Agent, or Firm — MH2 Technology Law Group LLP

(57) ABSTRACT

An antimicrobial toner particle composition is disclosed. The antimicrobial toner particle composition includes a binder resin, and an antimicrobial material in an effective antimicrobial amount comprising copper oxide. An image forming apparatus is also disclosed, capable of forming a fused antimicrobial image on a recording medium.

18 Claims, 1 Drawing Sheet

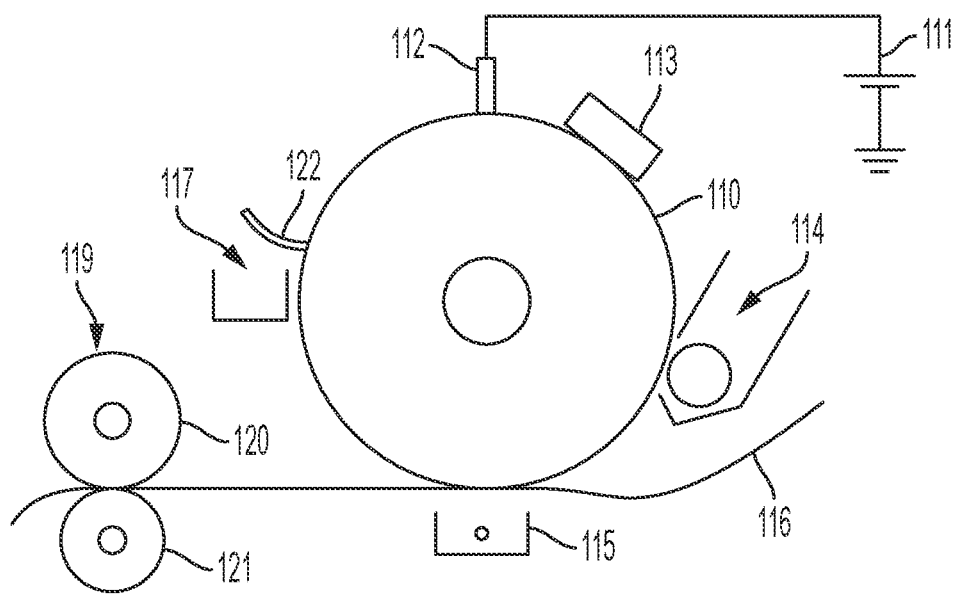

ANTIMICROBIAL TONER PARTICLES

FIELD OF THE DISCLOSURE

This disclosure relates generally to antimicrobial toner particles and an image forming apparatus using the antimicrobial toner particles. coatings, and more specifically to antimicrobial additives for antimicrobial toner particles.

BACKGROUND

The recent COVID-19 pandemic has emphasized a fresh and urgent focus on development of antimicrobial technologies that may prevent or slow disease transmission to populations. Disease transmission from touching contaminated surfaces is a potential avenue by which variety of diseases, including COVID-19, may spread. High-touch surfaces, or surfaces that may be touched frequently by many people are especially risky and may lead to disease spread in settings likes hospitals, schools, offices, libraries, public transport, and the like. Specific examples of high-touch surfaces include door handles and handrails, hospital and school furniture, keyboards, pin pads, common use devices, appliances, and the like. The inhibition of bacterial contamination on inanimate surfaces including high-touch surfaces such as doorknobs, bed or stair rails, touch screen monitors, cell phones may be desirable as well. With the current rise in infections and widespread antibiotic resistance, new coatings for these high-touch surfaces, especially in healthcare-associated environments such as hospitals, medical clinics or dental offices is highly advantageous. There is also a continuing problem related to bacterial and fungal contamination through contact with surfaces and objects also within airplanes and cruise ships. Individuals suffering from gastroenteritis, for example, can easily spread the illness by touching handrails, shared utensils, elevator buttons, etc. In some cases, contamination can be deadly especially in the cases of outbreaks of gastroenteritis acquired on cruise ships caused by Noroviruses or food poisoning due to particular strains of *Escherichia coli* and *Salmonella*. Another bacterium, *Staphylococcus aureus*, is a major culprit for many illnesses and skin irritations. There is a type of *Staphylococcus aureus* that is Methicillin-resistant (known as MRSA) which is resistant to the antibiotic methicillin and other drugs in this class. This need for fabricating or modifying high-touch surfaces, such that they are antimicrobial or antibacterial is expected to grow significantly as the current pandemic progresses and leaves a lasting transformation in consumer and public behavior towards disease prevention.

Therefore, a need exists for coated surfaces or a method of modifying a high-touch surface that can include antimicrobial agents to enhance antimicrobial or antibacterial activity of a high-touch surface. The ability to provide variable areas of antimicrobial or antibacterial functionality directly onto inanimate surfaces may result in cost savings and other advantages. Furthermore, the ability to print as needed instead of using traditional fabrication methods would also save considerable time and cost, since digital planning and printing may provide improved speed and applicability of antibacterial or antimicrobial protection for high-touch surfaces.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An antimicrobial toner particle composition is disclosed. The antimicrobial toner particle composition also includes a binder resin. The antimicrobial toner particle composition also includes an antimicrobial material in an effective antimicrobial amount including copper oxide.

The antimicrobial toner particle composition may include where the binder resin is a polystyrene/acrylate resin. The copper oxide may include a spherical particle. The copper oxide has a particle size from about 0.1 micron to about 10 micron. The antimicrobial material is present in the antimicrobial toner particle composition from about 0.2% to about 5.0% based on a total weight of the antimicrobial toner particle composition. The antimicrobial material further may include silver nanoparticles. A ratio of copper oxide to silver nanoparticles may be from about 1:1 to about 10:1. The antimicrobial toner particle composition further may include a quaternary ammonium compound. The quaternary ammonium compound may be benzalkonium chloride, methylbenzethonium chloride, tetraethylammonium bromide, or a combination thereof. The quaternary ammonium compound is present in the antimicrobial toner particle composition from about 0.01% to about 10.0% based on a total weight of the antimicrobial toner particle composition.

Another antimicrobial toner particle composition is disclosed. The antimicrobial toner particle composition also includes a binder resin which may include a polystyrene/acrylate resin. The antimicrobial toner particle composition also includes and an antimicrobial material present in the antimicrobial toner particle composition from about 0.2% to about 5.0% based on a total weight of the antimicrobial toner particle composition may include copper oxide.

Implementations of the antimicrobial toner particle composition may include where the copper oxide has a particle size from about 0.1 microns to about 20 microns. The antimicrobial material further may include silver nanoparticles. A ratio of copper oxide to silver nanoparticles is from about 1:1 to about 10:1. The toner particle composition further may include a quaternary ammonium compound. The quaternary ammonium compound is benzalkonium chloride, methylbenzethonium chloride, tetraethylammonium bromide, or a combination thereof.

An image forming apparatus is also disclosed. The image forming apparatus also includes a photoreceptor having a photosensitive layer, a charging device which charges the photoreceptor, an exposure device which exposes the charged photoreceptor to light, thereby forming an electrostatic latent image on a surface of the photoreceptor. The image forming apparatus also includes at least one developer station, where the developer station develops the electrostatic latent image on a surface of the photoreceptor to form an antimicrobial toner image may include a binder resin, a polystyrene/acrylate resin, and an antimicrobial material present in the antimicrobial toner particle composition from about 0.2% to about 5.0% based on a total weight of the antimicrobial toner particle composition may include copper oxide. The image forming apparatus also includes at least one transfer device for transferring the antimicrobial toner images to a recording medium. The image forming apparatus also includes a fuser station for fixing the antimicrobial toner image transferred to the recording medium by heating the recording medium, thereby forming a permanently fused antimicrobial image on the recording medium, where the fuser station may include a fuser member and a pressure member.

The image forming apparatus includes an antimicrobial toner particle composition where the copper oxide has a particle size from about 0.1 microns to about 20 microns. The antimicrobial material further may include silver nanoparticles. A ratio of copper oxide to silver nanoparticles is from about 1:1 to about 10:1.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

FIG. 1 is a schematic illustration of an image forming apparatus in accordance with the present disclosure.

It should be noted that some details of the figures may have been simplified and are shown to facilitate understanding of the embodiments rather than to maintain strict structural accuracy, detail, and scale.

DESCRIPTION OF THE EMBODIMENTS

Reference will now be made in detail to embodiments of the present disclosure. The following description is merely exemplary.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be utilized and that changes may be made without departing from the scope of the present teachings. The following description is, therefore, merely illustrative.

Although embodiments of the disclosure herein are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of resistors" may include two or more resistors.

As used herein, the modifier, "about," used in connection with a quantity is inclusive of the stated value and has the meaning dictated by the context (for example, it includes at least the degree of error associated with the measurement of the particular quantity). In embodiments, the terms of interest comprise a variation of less than about 10% from the stated value. When used in the context of a range, the modifier, "about," should also be considered as disclosing the range defined by the absolute values of the two endpoints. For example, the range "from about 2 to about 4" also discloses the range "from 2 to 4."

As used here, "metal acrylate(s)," such as, "silver acrylate(s)," is collective for acrylate monomers comprising at least one metal atom, such as, a silver atom, for use in polymers, such as, silver acrylate and silver methacrylate which are monomers for a polymer comprising silver.

The term, "antibacterial," as used herein refers to the property of a composition for inhibiting or destroying the growth of bacteria. In other words, a toner or toner component comprising antibacterial properties is effective in killing bacteria, or in inhibiting growth or propagation of bacteria, including as a printed image or structure.

The term, "antimicrobial," as used herein refers to an agent, or the property imparted by the agent, that kills or inhibits growth of microorganisms or microbes. An antibacterial agent, or property thereof, is an antimicrobial agent. Microorganisms include, for example, bacteria, fungi, algae, other single celled organisms, protists, nematodes, parasites, other multicellular organisms, other pathogens and so on. In other words, a toner or toner component comprising antimicrobial properties is effective in killing microbes, or in inhibiting growth and propagation of microbes, including as a printed image or structure. As "antibacterial" and "antimicrobial" are similar in terms of the effects the additives to disclosed toner compositions impart, they may, for the purposes of this disclosure to have similar meaning or intent of effect, in addition to similar terms, such as "antifungal," "biocidal," and the like.

The term, "nano," as used in, "copper oxide nanoparticles" or "silver nanoparticles," indicates a particle size of less than about 1000 nanometers (nm). In embodiments, the nanoparticles have a particle size of from about 0.5 nm to about 1000 nm, from about 1 nm to about 500 nm, from about 1 nm to about 100 nm, from about 1 nm to about 20 nm. The particle size is defined herein as the average diameter of the nanoparticles, as determined by TEM (transmission electron microscopy.) In embodiments, the composite nanoparticle has a volume average particle diameter (D50) of from about 10 to about 600 nanometers, or from about 10 to about 300 nanometers, or from about 10 to about 200 nanometers.

A polymer can be identified or named herein by the two or more of the constituent monomers used to construct the polymer, even though following polymerization, a monomer is altered and no longer is identical to the original reactant. Thus, for example, a polyester often is composed of a polyacid monomer or component and a polyalcohol monomer or component. Accordingly, if a trimellitic acid reactant is used to make a polyester polymer, that resulting polyester polymer can be identified herein as a trimellitic polyester. Also, a polymer can be composed of a styrene monomer and an acrylate monomer, and in that case, once polymerized, can be identified based on the monomers used. Hence, if the acrylate is butyl acrylate, the resulting polymer can be called a styrene polymer, a butyl acrylate polymer, a styrene/acrylate polymer and so on.

The terms "substrate," "media substrate," "print substrate," and "print media" generally refer to a usually flexible physical sheet of paper, polymer, Mylar® material, plastic, or other suitable physical print media substrate, fabric, sheets, webs, etc., for images, whether precut or web fed.

The term "printing device" or "printing system" as used herein refers to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing device" may print upon a surface in a manner that may be raised above the top surface of a substrate and further described as 2-dimensional (2D), 2.5-dimensional (2.5D), or 3-dimensional (3D), resulting in textured, structured, or raised print surfaces as printed by a "printing device." A "printing system" may handle sheets, webs, substrates, and the like. A printing system can place marks on any surface, and is any machine that reads marks on input sheets, or any combination of such machines.

All physical properties that are defined hereinafter are measured at 20° C. to 25° C. unless otherwise specified. The term "room temperature" refers to a temperature ranging from about 20° C. to about 25° C., such as about 22° C., unless otherwise specified.

Exemplary examples of antimicrobial toner particle compositions of the present disclosure include a binder resin, a charge control additive incorporated into the binder resin, one or more additives incorporated onto a surface of the binder resin, a wax, and an antimicrobial material including copper oxide. The antimicrobial toner particle compositions and methods herein can be applied to printing applications to produce laminated or adherable antibacterial images or patches that may be applied to high-touch contact areas. The toner compositions can be designed and optimized to be compatible with the different media substrates, image processing steps, additional antibacterial or antimicrobial additives, or combinations thereof to print and create antibacterial surfaces in a facile manner.

Based on the growing need for high performing products, especially when related to health and hygiene, the present toner compositions with antibacterial properties fill a market need and provide consumers with a robust, effective, and lasting antibacterial or antimicrobial protection on any printable surface or surface to which a printable adhering label may be affixed. Some key environments that can benefit from printing with the present antimicrobial toner compositions include hospitals, daycare centers, care homes, schools, dental offices, doctor offices, hospitals (e.g., charts memos, pictures), other types of medical offices, veterinary practices, law offices and courts (e.g., legal documents), kitchens, and restaurants (e.g., menus). The present antimicrobial toner, images, or surfaces printed therewith render any product or high-touch surface more hygienic, helping the product or surface maintain a fresh appearance by reducing or avoiding altogether odor causing or staining microbes and also avoid degradation of any important identification tag, label, or drug identification number (DIN) by the microbes themselves. In embodiments, the antimicrobial toner compositions comprise a copper oxide containing an antimicrobial material in an amount effective for antimicrobial properties. Copper oxide exhibits antimicrobial activity against a broad range of micro-organisms. Copper oxide is considered an ideal anti-microbial agent because it has a high effectiveness against a wide range of relevant microbes within a wide range of humidity levels and temperatures.

The antimicrobial toner compositions and exemplary embodiments disclosed herein can be used for any suitable or desired application. The toner is particularly suitable for anti-bacterial printing applications having the final goal of producing customizable, digitized antibacterial printed images, text, surface coatings, etc. Examples of applications include printing codes, labels, or logos on medical devices such as catheters, thermometers, and other medical devices, printing on menus, food packaging materials, cosmetic tools and products, etc.

In certain embodiments, the present antimicrobial toner compositions and exemplary embodiments disclosed herein may enable surfaces or objects to remain clean from microbes by directly printing or adhering a printed label or film with antimicrobial agents onto high-touch surfaces. Hospitals and medical clinics are some areas needing an extra layer of antimicrobial protection but these coatings can extend to any high traffic area and objects such as handles, public seating on buses, trains and airports, check-in kiosks, toilets, counters, push carts/trolleys, elevator buttons and escalator railings. Medical implant surfaces are another concerning issue of persistent microbial contamination that is prevalent in peri-(during surgery) and post-operative patients who suffer from microbial proliferation at the implant-tissue interface causing deadly biofilm associated infections. Other applications include digitally printed ID codes, short-run printable materials, printing on three-dimensional medical components such as catheters, cardiac stents, programmable pacemakers, and any other desired substrate.

The sources of microorganisms can be bacterial, viral, or fungal. Microorganism contamination can come from typical handling of objects and papers, etc., from airborne microbes via sneezing and coughing, and other manner of spreading of infection from contaminated persons or contact with contaminated objects. Contact of these microbes with the present toner compositions, including contact with a printed image or text prepared with the present toner compositions and exemplary embodiments disclosed herein, will inhibit the microbial growth and, in embodiments, destroy any possible colonization at the site of contact.

Referring to FIG. 1, in a typical electrostatic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 110 is charged on its surface by a charging device 112 to which a voltage is supplied from power supply 111. Photoreceptor 110 is then imagewise exposed to light from an optical system or an image input apparatus 113, such as a laser and light emitting diode, to form an electrostatic latent image on the photoreceptor 110. The photoreceptor 110 can be a drum or belt. In the embodiment of FIG. 1, the photoreceptor is shown as a drum. Generally, the electrostatic latent image is developed by bringing a developer mixture from developer station 114 into contact herewith. Development can be influenced by use of a magnetic brush, powder cloud, or other known development process. A dry developer mixture usually includes carrier granules having toner particles adhering triboelectrically thereto. Toner particles are attracted from the carrier granules to the latent image, forming a toner powder image. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 116 by transfer apparatus 115, which can be performed by pressure transfer or electrostatic transfer. Alternatively, the developed image can be transferred to an intermediate transfer member, or bias transfer member, and subsequently transferred to a copy sheet. Examples of copy or media substrates include paper, transparency material such as polyester, polycarbonate, or the like, cloth, wood, or any other desired material upon which the finished image will be situated.

After the transfer of the developed image is completed, copy sheet 116 advances to fusing station 119, depicted in FIG. 1 as fuser roll 120 and pressure roll 121 (although any other fusing member components such as fuser belt in contact with a pressure roll, fuser roll in contact with pressure belt, and the like, are suitable for use with the present apparatus), where the developed image is permanently fused to copy sheet 116 by passing copy sheet 116 between the fusing and pressure members, thereby forming a permanent image. Alternatively, transfer and fusing can be affected by a transfix application. Photoreceptor 110, subsequent to transfer, advances to cleaning station 117, where any toner left on photoreceptor 110 is cleaned therefrom by use of a blade 122 (as shown in FIG. 1), brush, or other cleaning apparatus. Alternatively, transfer and fusing can be affected by a transfix application.

In embodiments, an image forming apparatus as described includes a photoreceptor having a photosensitive layer, a charging device which charges the photoreceptor, an exposure device which exposes the charged photoreceptor to light, thereby forming an electrostatic latent image on a surface of the photoreceptor, and at least one developer station, wherein the developer station develops the electrostatic latent image on a surface of the photoreceptor to form an antimicrobial toner image comprising a binder resin comprising a polystyrene/acrylate resin, a charge control additive incorporated into the binder resin, one or more additives incorporated onto a surface of the binder resin, a wax present in an antimicrobial toner particle composition from about 1% to about 25% based on a total weight of the antimicrobial toner particle composition, and a pigment or antimicrobial material present in the antimicrobial toner particle composition from about 0.2% to about 5.0% based on a total weight of the antimicrobial toner particle composition comprising copper oxide. In certain embodiments, the copper oxide has a particle size from about 0.1 micron to about 10 microns. The image forming apparatus may include at least one transfer device for transferring the antimicrobial toner images to a recording medium, and a fuser station for fixing the antimicrobial toner image transferred to the recording medium by heating the recording medium, thereby forming a permanently fused antimicrobial image on the recording medium, wherein the fuser station comprises a fuser member and a pressure member. In certain embodiments, the pigment or antimicrobial material may also include silver nanoparticles, and a ratio of copper oxide to silver nanoparticles may be from about 1:1 to about 10:1 by weight.

Exemplary examples of antibacterial toners of the present disclosure may be used for electrostatographic or electrophotographic processes, including those disclosed in U.S. Pat. No. 4,295,990, the disclosure of which herein is incorporated by reference in entirety. In embodiments, any known type of image development system may be used in an image developing device, including, for example, magnetic brush development, jumping single component development, hybrid scavengeless development (HSD), 3D printers (including those disclosed in U.S. Pat. Nos. 5,204,055; 7,215,442; and 8,289,352) or any other type of priming apparatus that is capable of applying and fusing a toner on a substrate or to form an article of manufacture. Those and similar development systems are within the purview of those skilled in the art.

Color printers commonly use one to four, or more housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut) and to provide a clear coat or coating. It should be noted that the addition of antibacterial pigment or antimicrobial material additives may impart color and therefore shift standard color gamut in comparison to standard color toner formulations.

In embodiments are provided a label structure for applying an antibacterial printed image onto a surface. In embodiments the surface is 2-D (e.g., paper or a label) or 3-D (medical device, such as, a catheter or thermometer). In embodiments, the antibacterial printed image may be a clear coat formed with a near clear toner, or near colorless toner having a lower amount of an antibacterial pigment or antimicrobial material composition, and applied over a surface to provide an antimicrobial coating on the surface of a printed substrate or label. The clear coat may be applied over an earlier printed or flat image or may be applied as a coating to a 3-dimensional surface, such as, a medical instrument. In embodiments, the antimicrobial printed image is formed with a color toner to provide an antimicrobial image, such as, a label or UPC code. The color antimicrobial printed image may be a printed code, a printed text, or a printed logo.

The toner may be applied to a surface by fusing at a temperature that adheres the toner to the surface, but does not diminish or destroy the antimicrobial properties of the toner. In embodiments, the toner is fused at a temperature from about 80° C. to about 130° C., less than about 125° C., less than about 120° C. less than about 115° C., or lower.

In embodiments, the toner is one which is amenable to fusing without elevated temperatures, a cold fusing process, that can rely on pressure alone, for example, to fuse toner to a surface or to a substrate.

The antibacterial toner described herein is applied by an image forming apparatus. The antibacterial toner includes a binder resin, a charge control additive incorporated into the binder resin, one or more additives incorporated onto a surface of the binder resin, a wax, and one or more antibacterial pigments or antimicrobial materials. An exemplary example of an antibacterial pigment may include an antimicrobial material comprising copper oxide, present in an amount effective for imparting antimicrobial properties to the antibacterial toner composition. In this manner, the antimicrobial toner image is formed on a recording medium, such as paper or other medium, in a customized size and shape. This a printing system or image forming apparatus which provides a variable image formed using variable image data which generates images having customized shapes and sizes having antimicrobial or antibacterial properties.

In embodiments, the binder resin is a polystyrene/acrylate resin. In other embodiments, the copper oxide is a spherical particle, and may have a particle size from about 0.1 microns to about 20 microns. The antibacterial pigment or antimicrobial material may be present in the antimicrobial toner particle composition from about 0.2% to about 5.0% based on a total weight of the antimicrobial toner particle composition. The antibacterial pigment may include silver nanoparticles in certain embodiments wherein a ratio of copper oxide to silver nanoparticles is from about 1:1 to about 10:1.

Exemplary examples of antibacterial toner compositions of the present disclosure may include quaternary ammonium compounds, such as benzalkonium chloride, methylbenzethonium chloride, tetraethylammonium bromide, or a combination thereof, and present in the antimicrobial toner particle composition from about 0.01% to about 10.0% based on a total weight of the antimicrobial toner particle composition.

Examples of the binder resin may include vinyl-based resins including homopolymers of one monomer and/or copolymers of two or more monomers selected from the following monomers: styrenes (for example, styrene, parachlorostyrene, or. alpha.-methylstyrene); (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, or 2-ethylhexyl methacrylate); ethylenically unsaturated nitriles (for example, acrylonitrile or methacrylonitrile); vinyl ethers (for example, vinyl methyl ether or vinyl isobutyl ether); vinyl ketones (for example, vinyl methyl ketone, vinyl ethyl ketone, or vinyl isopropenyl ketone); and olefins (for example, ethylene, propylene or butadiene).

Other examples of the binder resin may include non-vinyl-based resins such as epoxy resins, polyester resins, polyurethane resins, polyamide resins, cellulose resins, polyether resins, or modified rosins; mixtures of the non-vinyl-based resins with the vinyl-based resins; and graft polymers obtained by polymerization of vinyl-based monomers in the coexistence of the above-described resins. These binder resins may be used alone or in a combination of two or more kinds.

Examples of polyester resins include a poly-condensate of a polyvalent carboxylic acid and a polyol. For an amorphous polyester resin, a commercially available resin may be used, or a synthesized resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenylsuccinic acid, adipic acid, or sebacic acid); alicyclic dicarboxylic acids (for example, cyclohexane dicarboxylic acid); aromatic dicarboxylic acids (for example, terephthalic acid, isophthalic acid, phthalic acid, or naphthalene dicarboxylic acid); anhydrides of the above-described acids; and lower (for example, the number of carbon atoms is from 1 to 5) alkyl esters of the above-described acids.

Polyvalent carboxylic acid, a tri- or higher-valent carboxylic acid having a crosslinked structure or a branched structure may be used in combination of a dicarboxylic acid. Examples of the tri- or higher-valent carboxylic acid include trimellitic acid, pyromellitic acid, anhydrides thereof, and lower (for example, the number of carbon atoms is from 1 to 5) alkyl esters thereof. These polyvalent carboxylic acids may be used alone or in a combination of two or more kinds.

Examples of the polyol used in the binder resin include aliphatic diols (for example, ethylene glycol, diethylene glycol, triethylene glycol, propylene glycol, butane diol, hexane diol, or neopentyl glycol); alicyclic diols (for example, cyclohexane diol, cyclohexane dimethanol, or hydrogenated bisphenol A); and aromatic diols (for example, ethylene oxide adducts of bisphenol A or propylene oxide adducts of bisphenol A). Among these, as the polyol, for example, aromatic diols and alicyclic diols are preferable, and aromatic diols are more preferable.

As the polyol, a tri- or higher-hydric alcohol having a crosslinked structure or a branched structure may be used in combination of a diol, Examples of the tri- or higher-hydric alcohol include glycerin, trimethylolpropane, and pentaerythritol. These polyols may be used alone or in a combination of two or more kinds.

In some embodiments, a glass transition temperature (Tg) of the polyester resin is from 50° C. to 80° C. and in embodiments from 50° C. to 65° C.

In some embodiments, a weight average molecular weight (Mw) of the polyester resin is from 5,000 to 1,000,000 and in embodiments from 7,000 to 500,000.

In some embodiments, a number average molecular weight (Mn) of the polyester resin is from 2,000 to 100,000.

In some embodiments, a molecular weight distribution Mw/Mn of the polyester resin is from 1.5 to 100 or in embodiments from 2 to 60.

The weight average molecular weight and the number average molecular weight are measured by gel permeation chromatography (GPC). The weight average molecular weight and the number average molecular weight are calculated using a molecular weight calibration curve that is prepared from a monodisperse polystyrene standard sample based on the measurement result.

The polyester resin may be prepared using, for example, a well-known preparation method. Specifically, in this method, for example, a polymerization temperature is set to be from. 180° C. to 230° C., the internal pressure of the reaction system is optionally decreased, and a reaction is caused while removing water and alcohol produced during condensation.

When monomers of raw materials are not soluble or compatible at a reaction temperature, a high boiling point solvent may be added thereto as a solubilizer to dissolve the monomers therein. In this case, the poly-condensation reaction is carried out while distilling the solubilizer away. When a monomer having poor compatibility is present in the copolymerization reaction, the monomer having the poor compatibility may be condensed with an acid or an alcohol which is to be poly condensed with the monomer, and then the obtained condensate may be poly-condensed with a major component.

In some embodiments, the content of the binder resin in the antibacterial toner is, for example, from 40% by weight to 95% by weight, or in embodiments from 50% by weight to 90% by weight, or from 60% by weight to 85% by weight with respect to the total weight of the toner particles.

The antibacterial toner optionally may further include a release agent and other additives, including one or more waxes.

Examples of the wax, or release agent include hydrocarbon waxes; natural waxes such as carnauba wax, rice wax, or candelilla wax; synthetic or mineral and petroleum waxes such as montan wax; and ester waxes such as fatty acid esters or montanic acid esters. The release agent is not limited to these examples.

A toner of the present disclosure optionally may contain a wax, which can be either a single type of wax or a mixture of two or more different waxes. When included, the wax may be present in an amount of, for example, from about 1 wt % to about 25 wt % of the toner particles, from about 5 wt % to about 20 wt % of the toner particles. The melting point of a wax can be at least about 60° C., at least about 70° C., at least about 80° C. Waxes that may be selected include waxes having, for example, a weight average molecular weight of from about 500 to about 20,000, from about 1,000 to about 10,000. Wax particles can be from about 125 nm to about 250 nm, from about 150 to about 225 nm, from about 175 to about 200 nm in size.

Waxes that may be used include, for example, polyolefins, such as, polyethylene, polypropylene and polybutene waxes, such as, commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as, carnauba wax, rice wax, candelilla wax, sumacs wax and jojoba oil; animal-based waxes, such as, beeswax; mineral-based waxes and petroleum-based waxes, such as, montan wax, ozokerite, ceresin, paraffin wax, microcrystalline wax and Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate, pentaerythritol tetra behenate; ester waxes obtained from higher fatty acid and multivalent alcohol multimers, such as, diethyleneglycol monostearate, dipropyleneglycol distearate, diglyceryl distearate and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™ SUPERSLIP 6530™ available from Micro Powder Inc., fluorinated waxes, for example, POLYFLUO 190™, POLYFLUO 200™, POLYSILK 19™ and POLYSILK 14™ available from Micro Powder Inc., mixed fluorinated, amide waxes, for example, MICROSPERSION 19™ available from Micro Powder Inc., imides, esters, quaternary amines, carboxylic acids or acrylic polymer emulsion, for example JONCRYL 74™, 89™, 130™, 537™ and 538™, all available from SC Johnson Wax, and chlorinated polypropylenes and polyethylenes available from Allied Chemical and Petrolite Corporation and SC Johnson wax. Mixtures and combinations of the foregoing waxes also may be used in embodiments.

Examples of other additives may include well-known additives such as a magnetic material, a charge control agent, or an inorganic powder. The antibacterial toner particles contain these additives as internal additives. The antibacterial toner may be produced by preparing toner particles and adding external additives to the toner particles.

A method of preparing the antibacterial toner is not particularly limited, and may be prepared using a well-known dry method such as a kneading and pulverizing method or a well-known wet method such as an emulsion aggregating method or a dissolution suspension method.

Toner particles also may contain optional additives, as desired or required. For example, the toner may include any known charge additives in amounts of from about 0.1 to about 10 wt %, from about 0.5 to about 7 wt % of the toner. Examples of such charge additives include alkyl pyridinium halides, bisulfates, the charge control additives of U.S. Pat. Nos. 3,944,493, 4,007,293, 4,079,014, 4,394,430 and 4,560,635, the entire disclosure of each of which herein is incorporated by reference in entirety, negative charge enhancing additives, such as, aluminum complexes, and the like.

Surface additives can be added to the toner compositions after washing or drying. Other examples of such surface additives include, for example, metal salts, metal salts of fatty acids, colloidal silicas, metal oxides, strontium titanates, mixtures thereof and the like.

Surface additives may be present in an amount of from about 0.1 to about 10 wt %, from about 0.5 to about 7 wt % of the toner. Examples of such additives include those disclosed in U.S. Pat. Nos. 3,590,000, 3,720,617, 3,655,374 and 3,983,045, the entire disclosure of each of which herein is incorporated by reference in entirety. Other additives include zinc stearate and AEROSIL R972® (Degussa). The coated silicas of U.S. Pat. Nos. 6,190,815 and 6,004,714, the disclosure of each of which herein is incorporated by reference in entirety, also can be present in an amount of from about 0.05 to about 5%, from about 0.1 to about 2% of the toner, which additives can be added during aggregation or blended into the formed toner product.

The characteristics of the toner particles may be determined by any suitable technique and apparatus. Volume average particle diameter, D50v, number average particle diameter, D16n, D50n, GSDv, GSDn and so on are examples of parameters of characterizing particles and particle populations. Some metrics may be obtained by means of a measuring instrument, such as, a Beckman Coulter MULTISIZER 3, operated as recommended by the manufacturer. Cumulative particle distributions can be used to obtain various population parameters, which can be used to determine or to estimate, for example, median size, amount of coarse particles, amount of fine particles and so on. The relative amount of fine particles can be determined from the D50n/D16n value, which can be less than about 1.25 or lower. The percent of fine particles in the populations can be less than about 3.5% or lower.

The gloss level of a toner may have a gloss, as measured with a Gardner device, of from about 01 gloss units (gu) to about 100 gu.

In embodiments, toners of the present disclosure may be utilized as low melt toners, such as, ultra low melt (ULM) toners. In embodiments, the dry toner particles, exclusive of external surface additives, may have the following characteristics:

(1) circularity of from about 0.9 to about 1 (measured with, for example, a Sysmex 3000), from about 0.95 to about 0.99, from about 0.96 to about 0.98;

(2) Tg of from about 45° C. to about 60° C., from about 48° C. to about 55° C.; and/or (3) melt flow index (MFI) in g/10 min (5 kg/130° C.) of from about 70 to about 170.

Toners may possess favorable charging characteristics when exposed to a variety of relative humidity (RH) conditions. Styrene/acrylate resin in the core can provide improved charging of the toner particle under plural environmental conditions as compared to an analogous toner but containing only polyester in the core. Presence of a styrene/acrylate resin enables tuning or altering the composition to obtain a more robust toner particle that is optimized under plural environmental conditions, as revealed by testing and optimized performance in more than one zone, such as, A and B zones. The styrene/acrylate resin(s) also lessen or diminish less desirable properties of polyester-only toner.

The toner particles thus formed may be formulated into a developer composition. For example, the toner particles may be mixed with carrier particles to achieve a two component developer composition. The toner concentration in the developer may be from about 1% to about 25% by weight of the total weight of the developer with the remainder of the developer composition being the carrier. However, different toner and carrier percentages may be used to achieve a developer composition with desired characteristics.

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, the carrier particles may include a core with a coating thereover, which may be formed from a polymer or a mixture of polymers that are not in close proximity thereto in the triboelectric series, such as, those as taught herein, such as, a hybrid of interest, or as known in the art. The coating may include fluoropolymers, terpolymers of styrene, silanes and the like. The coating may have a coating weight of for example, from about 0.1 to about 10% by weight of the carrier.

Various effective suitable means can be used to apply the polymer to the surface of the carrier core, for example, cascade roll mixing, tumbling, milling, shaking, electrostatic powder cloud spraying, fluidized bed mixing, electrostatic disc processing, electrostatic curtain processing, combinations thereof and the like. The mixture of carrier core particles and polymer then may be heated to enable the polymer to melt and to fuse to the carrier core. The coated carrier particles then may be cooled and thereafter classified to a desired particle size.

In some embodiments, the antibacterial toner may include silica having a primary particle size diameter of from 7 nm to less than 12 nm in an amount of about 0.1 weight percent to about 0.5 weight percent of the antibacterial toner and tabular shape antibacterial pigments. The small particle silica provides a narrow charge distribution to the antibacterial toner. In embodiments, the small silica is a negatively charging silica. Suitable negative charging silicas include 7 nm size Cabot silica TS-530 treated with HMDS; 7 nm Nippon Aerosil silica R976 treated with dimethydichlorosilane, 7 nm RX300, R812, and R812S, all three treated with hexamethyl disilazide (HMDS), and 7 nm R106 treated with octamethylcyclotetrasiloxane; and 8 nm Wacker H30TD treated with polydimethylsiloxane (PDMS), H30™ treated with HMDS, and H30TX treated with both HMDS and PDMS.

In embodiments a second silica may added in the size range of about 12 nm to less than 30 nm. Effective loadings of the second silica range from about 0.1 percent to 1 percent by weight of the antibacterial toner. Suitable second silicas include negative charging Nippon Aerosil 12 nm R974 treated with dimethyldichlorosilane, 12 nm RX200 treated with HMDS and 12 nm RY200 treated with PDMS, and 16 nm R202 and RY200S both treated with PDMS. In embodiments the second silica may include a positive charging silica, including Nippon Aerosil 12 nm R05 and RA200HS treated with HMDS and an aminosilane, and Wacker H2050 a 12 nm silica with a treatment that includes an alkyl amine and alklyamine salt, PDMS/NR2/NR3+.

In embodiments, a third silica may be added in the size range of about 30 nm to about 50 nm. Effective loadings of the third silica range from about 1 percent to about 3 percent by weight of the antibacterial toner. Suitiable silicas include negatively charging Nippon Aerosil 40 nm RY50 and RX50, PDMS and HMDS treated respectively, 30 nm NY50 PDMS treated silica, 30 nm HMDS treated NAX50 silica, and positive charging 30 nm VP NA50H and Na50HS, both treated with a combination of HMDS and an aminosilane.

In some embodiments, a surface additive may include titanium dioxide. Titanium dioxide may be added as a toner surface additive in effective amounts of about 0.5 percent to about 2 percent by weight of the antibacterial toner, with a primary particles size of about 15 nm to about 40 nm. Suitable titanium dioxide particles include 40 nm STM5103 from Tayca which is treated with a decylsilane, 25 nm T805 titanium dioxide from Nippon Aerosil which is treated with octylsilane, and 30 to 50 nm STT-30 EHJ titanic from Titan Kogyo which is treated with silicone oil.

In some embodiments, a surface additive may include a metal stearate. The metal stearate may be included as a surface additive to improve charge level and to maintain sufficient developer conductivity in a conductive magnetic brush (CMB) development system, including Hybrid Jumping Development (HJD) systems and Hybrid Scavengless Development (HSD) systems, as described in U.S. Pat. Nos. 6,026,264 and 8,577,236 and references therein. Suitable metal stearates includes, but is not limited to, aluminum stearate, calcium stearate and zinc stearate. Effective of the stearate amounts vary from about 0.2 to about 1 weight percent of the antibacterial toner.

In embodiments, the toner particles optionally may comprise one or more colorants. In embodiments, the toner particles may be colorless or clear. Various known suitable colorants, such as dyes, pigments, mixtures of dyes, mixtures of pigments, mixtures of dyes and pigments and the like may be included in the toner. The colorant may be included in the toner in an amount of for example, 0 to about 35% by weight of the toner, from about 1 to about 25% of the toner, from about 3 to about 20% by weight of the toner, although amounts outside those ranges may be utilized.

As examples of suitable colorants, mention may be made of carbon black like REGAL 330®; magnetites, such as Mobay magnetites MO8029™ and MO8060™; Columbian magnetites; MAPICO BLACKS™, surface-treated magnetites; Pfizer magnetites CB4799™, CB5300™, CB5600™ and MCX6369™; Bayer magnetites, BAYFERROX 8600™ and 8610™; Northern Pigments magnetites, NP-604™ and NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes, or mixtures thereof, are used. The pigment or pigments can be water-based pigment dispersions.

Specific examples of pigments include SUNSPERSE 6000, FLEXIVERSE and AQUATONE water-based pigment dispersions from SUN Chemicals, HELIOGEN BLUE L6900™, D6840™, D7080™, D7020™, PYLAM OIL BLUE™, PYLAM OIL YELLOW™, PIGMENT BLUE I™ available from Paul Uhlich & Company, Inc., PIGMENT VIOLET I™, PIGMENT RED 48™, LEMON CHROME YELLOW DCC 1026™, E. D. TOLUIDINE RED™ and BON RED C™ available from Dominion Color Corp., Ltd., Toronto, CA, NOVAPERM YELLOW FGL™, HOSTAPERM PINK E™ from sanofi, CINQUASIA MAGENTA™ available from E.I. DuPont de Nemours & Co. and the like. Colorants that can be selected are black, cyan, magenta, yellow and mixtures thereof. Examples of magenta colorants are 2,9-dimethyl-substituted quinacridone and anthraquinone dye identified in the Color Index (CI) as CI 60710, CI Dispersed Red 15, diazo dye identified in the Color Index as CI 26050, CI Solvent Red 19 and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, Anthrathrene Blue, identified in the Color Index as CI 69810, Special Blue X-2137 and the like. Examples of yellows are diarylide yellow 3,3-dichlorobenzidene acetoacetanilides, a monoazo pigment identified. In the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL. Colored magnetites, such as, mixtures of MAPICO BLACK™, and cyan components also may be selected as colorants. Other known colorants can be selected, such as, Levanyl Black A-SF (Miles, Bayer) and Sunsperse Carbon Black LHD 9303 (Sun Chemicals), and colored dyes, such as Neopen Blue (BASF), Sudan Blue OS (BASF), PV Fast Blue B2G01 (sanofi), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (sanofi), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (sanofi), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann, CA), E. D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like.

It is known by those skilled in the art that copper and silver possess antimicrobial properties and share what is referred to as the oligodynamic effect, which is a biocidal effect of metals. Such metals release ions which covalently bond to proteins and therefore disrupt the ability of these cells to function or replicate. An additional mechanism known in copper and copper compounds in their action against microbes is the release of an electron in certain forms, which created a reactive oxygen species and can be highly destructive to viruses, bacteria, fungi, and the like. Copper and copper compounds are also non-toxic to humans and less problematic in the environment. Copper and its compounds are also effective under a broader set of conditions than some other antibacterial elements or compounds. Under certain lower temperature conditions, the efficacy of silver may be reduced. By contrast, copper maintains its efficacy across a range of temperatures and humidity.

In some embodiments, an antimicrobial material may include metals other than copper. Examples of the metal antimicrobial material disclosed herein may include a metal powder of silver, aluminum, brass, bronze, nickel, zinc, and the like. The content of the metal antimicrobial material in the antibacterial toner may be from 1 part by weight to 70 parts by weight of the binder resin and in embodiments from 5 parts by weight to 50 parts by weight with respect to 100 parts by weight of the binder resin described herein. Exemplary examples of copper oxide antimicrobial material include spherical copper oxide particles ranging from about 0.1 to about 10 microns in size.

Any suitable or desired metal can be selected for embodiments herein provided that the metal imparts the desired anti-bacterial effect, antifungal effect, antiviral biocide effect, or combination thereof. While other metals can be used, only certain ones will have anti-bacterial properties. In embodiments, Co, Ag, Ni, Au and Pd can be used in a copper-based composite, wherein the Co, Ag, Ni, Au, Pd, or mixture or combination thereof can impart anti-bacterial and/or anti-microbial properties. In embodiments, Ag and Cu are selected. In other embodiments, composites including Pt, Al, Cr, In, and mixtures and combinations thereof, can be selected.

In embodiments, the copper nanoparticles may comprise solely elemental copper or may be a copper composite or alloy, including composites or alloys with other metals. Such metal-copper composite may include one or more other metals. Suitable other metals include for example Al, Au, Pt, Pd, Ag, Co, Cr, In, and Ni, particularly the transition metals for example Au, Pt, Pd, Ag, Cr, Ni, and mixtures thereof. Exemplary metal composites are Au—Cu, Ag—Cu, Au—Ag—Cu, and Au—Cu—Pd. The various components of the copper composite may be present in an amount ranging, for example, from about 0.01% to about 99.9% by weight, particularly from about 10% to about 90% by weight. In embodiments, the copper composite is a metal alloy composed of copper and one, two or more other metals, with copper comprising for example at least about 20% of the nanoparticles by weight, particularly greater than about 50% of the nanoparticles by weight. Unless otherwise noted, the weight percentages recited herein for the components of the copper-containing nanoparticles do not include stabilizer. Those skilled in the art will appreciate that metals other than copper may be useful and can be prepared or combined with antimicrobial toner compositions in accordance with the disclosure herein.

In some embodiments, antimicrobial toner compositions as disclosed herein may include quaternary ammonium compounds (QACs). Quaternary ammonium compounds (QACs) are sometimes also referred to as quats, and may be useful as biocides in several applications such as wound dressings, lotions, cleansers, and those as described herein. These compounds are cationic surfactants, or positively charged surface-active agents, that impact cell walls and membranes after relatively long contact times. The permanent positive charge of QACs makes them bind readily to the negatively charged surface of most microbes. QACs are generally very stable, mostly unaffected by pH levels, and remain effective on surfaces for prolonged periods of time. The antimicrobial activity QACs may be more selective than that of other disinfectants, however, they are generally very effective against bacterial biofilms. Examples of QACs include benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, domiphen bromide, and others known in the art.

Typical loadings of the antibacterial, antimicrobial, or biocide additives may range anywhere from about 0.01% to about 30% by weight of the total weight of the antimicrobial toner compositions, or from about 0.1% to about 2.0%, or from about 1% to about 10% by weight of the total weight of the antimicrobial toner compositions. The quaternary ammonium compounds (QACs) may be incorporated into the binder resin, one of the surface additives, the wax, or any combination thereof.

Any suitable substrate, recording sheet, media, or removable support, stage, platform, and the like, may be employed for depositing the toner compositions thereon, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An antimicrobial toner particle composition, comprising:
   a binder resin;
   a surface additive blended with the binder resin;
   a wax combined with the binder resin; and
   an antimicrobial material in an effective antimicrobial amount comprising:
   copper oxide;
   a metal comprising Pd; and
   a quaternary ammonium compound incorporated into the binder resin, a surface additive, a wax, or a combination thereof.

2. The antimicrobial toner particle composition of claim 1, wherein the binder resin is a polystyrene/acrylate resin.

3. The antimicrobial toner particle composition of claim 1, wherein the copper oxide comprises a spherical particle.

4. The antimicrobial toner particle composition of claim 1,
   wherein the copper oxide has a particle size from about 0.1 µm to about 10 µm.

5. The antimicrobial toner particle composition of claim 1, wherein the copper oxide is present in the antimicrobial toner particle composition from about 0.2% to about 5.0% based on a total weight of the antimicrobial toner particle composition.

6. The antimicrobial toner particle composition of claim 1, wherein the antimicrobial toner particle composition further comprises metal nanoparticles comprising Ag, Co, Ni, Au, or a combination thereof.

7. The antimicrobial toner particle composition of claim 6, wherein a ratio of copper oxide to metal nanoparticles is from about 1:1 to about 10:1.

8. The antimicrobial toner particle composition of claim 1, wherein the quaternary ammonium compound is benzalkonium chloride, methylbenzethonium chloride, tetraethylammonium bromide, or a combination thereof.

9. The antimicrobial toner particle composition of claim 1, wherein the quaternary ammonium compound is present in the antimicrobial toner particle composition from about 0.01% to about 10.0% based on a total weight of the antimicrobial toner particle composition.

10. An antimicrobial toner particle composition, comprising:
    a binder resin comprising a polystyrene/acrylate resin;
    a surface additive blended with the binder resin;
    a wax combined with the binder resin;
    copper oxide present in the antimicrobial toner particle composition from about 0.2% to about 5.0% based on a total weight of the antimicrobial toner particle composition;
    a metal comprising Pd; and
    a quaternary ammonium compound incorporated into the binder resin, a surface additive, a wax, or a combination thereof.

11. The antimicrobial toner particle composition of claim 10, wherein the copper oxide has a particle size from about 0.1 µm to about 20 µm.

12. The antimicrobial toner particle composition of claim 10, wherein the antimicrobial toner particle composition further comprises silver metal nanoparticles comprising Ag, Co, Ni, Au, or a combination thereof.

13. The antimicrobial toner particle composition of claim 12, wherein a ratio of copper oxide to metal nanoparticles is from about 1:1 to about 10:1.

14. The antimicrobial toner particle composition of claim 10, wherein the quaternary ammonium compound is benzalkonium chloride, methylbenzethonium chloride, tetraethylammonium bromide, or a combination thereof.

15. An image forming apparatus comprising:
    a photoreceptor having:
    at least one developer station, the developer station which develops an electrostatic latent image on a surface of the photoreceptor to form an antimicrobial toner image comprising a binder resin, a surface additive blended with the binder resin, a wax combined with the binder resin, and an antimicrobial additive present in an antimicrobial toner particle composition from about 0.2% to about 5.0% based on a total weight of the antimicrobial toner particle composition comprising copper oxide, a metal comprising Pd, and a quaternary ammonium compound incorporated into the binder resin, a surface additive, a wax, or a combination thereof,
    at least one transfer device for transferring the antimicrobial toner images to a recording medium; and
    a fuser station for fixing the antimicrobial toner image transferred to the recording medium by heating the recording medium, thereby forming a permanently fused antimicrobial image on the recording medium.

16. The image forming apparatus of claim 15, wherein the copper oxide has a particle size from about 0.1 mm to about 20 mm.

17. The image forming apparatus of claim 15, wherein the antimicrobial additive further comprises silver metal nanoparticles.

18. The image forming apparatus of claim 17, wherein the antimicrobial toner image is formed on the recording medium in a customized size and shape.

* * * * *